US011374710B2

(12) United States Patent
Zhang

(10) Patent No.: US 11,374,710 B2
(45) Date of Patent: Jun. 28, 2022

(54) METHOD AND DEVICE FOR WIRELESS COMMUNICATION

(71) Applicant: SHANGHAI LANGBO COMMUNICATION TECHNOLOGY COMPANY LIMITED, Shanghai (CN)

(72) Inventor: XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 133 days.

(21) Appl. No.: 16/499,831

(22) PCT Filed: Jun. 2, 2017

(86) PCT No.: PCT/CN2017/086925
§ 371 (c)(1),
(2) Date: Sep. 30, 2019

(87) PCT Pub. No.: WO2017/211228
PCT Pub. Date: Dec. 14, 2017

(65) Prior Publication Data
US 2021/0367723 A1    Nov. 25, 2021

(30) Foreign Application Priority Data

Jun. 6, 2016    (CN) .......................... 201610393139.6

(51) Int. Cl.
*H04L 5/00*        (2006.01)
*H04W 72/04*      (2009.01)
*H04W 72/00*      (2009.01)

(52) U.S. Cl.
CPC ......... *H04L 5/0048* (2013.01); *H04W 72/005* (2013.01); *H04W 72/0446* (2013.01); *H04W 72/0453* (2013.01)

(58) Field of Classification Search
CPC .............. H04L 5/0048; H04W 72/005; H04W 72/0446; H04W 72/0453
See application file for complete search history.

(56) References Cited

U.S. PATENT DOCUMENTS

| 7,782,807 | B2 | 8/2010 | Yoon et al. |
| 9,392,603 | B2 | 7/2016 | Nakano |

(Continued)

FOREIGN PATENT DOCUMENTS

| CN | 101449535 A | 6/2009 |
| CN | 101632315 A | 1/2010 |

(Continued)

OTHER PUBLICATIONS

CN First Office Action dated Jul. 1, 2019 as received in Application No. 201610393139.6.

(Continued)

*Primary Examiner* — Melvin C Marcelo
(74) *Attorney, Agent, or Firm* — Maschoff Brennan

(57) ABSTRACT

The present disclosure provides a method and a device in wireless communication. In an embodiment, a UE receives a first signaling; and then receives a first radio signal in a target time-frequency resource. Herein, the first signaling is used for determining at least the former of a subcarrier spacing corresponding to a first radio signal and the target time-frequency resource, the first signaling is a physical layer signaling. The present disclosure allows multiple subcarrier spacings to be dynamically configured on a same frequency band so as to ensure that a same bandwidth meets various bandwidth requirements posed by different applica- (Continued)

tions. In addition, the present disclosure prevents the UE from determining a subcarrier spacing through blind detection, thus reducing the complexity of the UE.

16 Claims, 13 Drawing Sheets

(56) References Cited

U.S. PATENT DOCUMENTS

| | | | |
|---|---|---|---|
| 2015/0256308 A1 | 9/2015 | Ma et al. | |
| 2016/0352551 A1* | 12/2016 | Zhang | ............... H04L 27/26025 |
| 2021/0235432 A1* | 7/2021 | Zhao | ..................... H04W 72/04 |
| 2021/0266945 A1* | 8/2021 | Ma | ....................... H04W 76/14 |

FOREIGN PATENT DOCUMENTS

| | | |
|---|---|---|
| CN | 103716276 A | 4/2014 |
| CN | 104718774 A | 6/2015 |
| CN | 105228248 A | 1/2016 |
| WO | 2016/004634 A1 | 1/2016 |

OTHER PUBLICATIONS

CN Second Office Action dated Aug. 29, 2019 as received in Application No. 201610393139.6.
Search Report in CN application No. 2016103931396 dated Jun. 21, 2019.

* cited by examiner

METHOD AND DEVICE FOR WIRELESS COMMUNICATION

CROSS-REFERENCE TO RELATED APPLICATION

This application is a continuation of International Application No. PCT/CN2017/086925, filed Jun. 2, 2017, claiming the priority benefit of Chinese Patent Application Serial Number 201610393139.6, filed on Jun. 6, 2016, the full disclosure of which is incorporated herein by reference.

BACKGROUND

Technical Field

The present disclosure relates to transmission schemes of radio signals in wireless communication systems, and in particular to a method and a device of wireless communication for configurable subcarrier spacings.

Related Art

In existing Long-term Evolution (LTE) and Long Term Evolution Advanced (LTE-A) systems, subcarrier spacings of each downlink channel are the same and equal to 15 kHz. In Release-14, the practice of employing a subcarrier spacing of 3.75 kHz for uplink, which targets Internet of Things (IoT) communication, especially Narrowband (NB)-IoT equipment, was proposed to reduce complexity and total cost of the terminal equipment.

Currently, New Radio (NR) access technologies have been approved as a project by the 3rd Generation Partner Project (3GPP), in which three scenarios are defined in Technical Report (TR) 38.913, including enhanced Mobile Broadband (eMBB), massive Machine Type Communications (mMTC) and Ultra-Reliable and Low Latency Communications (URLLC). These application scenarios and corresponding wireless communication technologies may require the system to support multiple subcarrier spacings. At the 3GPP RAN1 #84bis and #85 plenary sessions, multiple subcarrier spacings were discussed, such as 15 kHz and 17.06 kHz.

SUMMARY

An illustrational method of supporting multiple subcarrier spacings is to divide a large bandwidth into many sub-bands, and indicate subcarrier spacing corresponding to each sub-band through broadcast information. However, the above method will make it harder to adapt to abrupt business requirements due to longer configuration period of the subcarrier spacing on each sub-band.

In view of the above problem, the present disclosure provides a solution. It should be noted that the embodiments in the present disclosure and the characteristics of the embodiments may be arbitrarily combined if there is no conflict. For instance, embodiments of the User Equipment (UE) in the present disclosure and characteristics of the embodiments can be applied to the base station, and vice versa.

The present disclosure provides a method in a UE that supports configurable subcarrier spacings, comprising:
  receiving a first signaling; and
  receiving a first radio signal on a target time-frequency resource, or transmitting the first radio signal on the target time-frequency resource.

Herein, the first signaling is used for determining at least the former of a subcarrier spacing corresponding to the first radio signal or the target time-frequency resource. The target time-frequency resource belongs to a first frequency band in frequency domain. The first signaling is a higher layer signaling, or the first signaling is specific to the UE, or the first signaling is specific to a terminal group and the UE belongs to the terminal group.

In existing LTE and LTE-A systems, a subcarrier spacing corresponding to a downlink transmission of the UE is 15 kHz, while an uplink (UL) transmission is a UL Grant-based scheduling. Therefore, the UE will never fail to determine a subcarrier spacing for a channel transmission. In NR system, there may be more than one mode of transmitting various subcarrier spacings within a system bandwidth, and a UE may support various subcarrier spacings simultaneously within a short time window, thus enabling the UE to determine subcarrier spacings for transmission.

In the above method, the first signaling is a physical layer signaling, which means that the dynamic configuration of subcarrier spacings is realized, and then emergent business requirements can be better met.

In one embodiment, the first signaling is specific to the UE. In the above embodiment, different UEs may employ different subcarrier spacings in a same frequency band, so that resources are configured in a much more flexible manner to satisfy varying business requirements of each UE.

In one embodiment, the first signaling is a physical layer signaling.

In one embodiment, the first signaling is Downlink Control Information (DCI) with DL grant.

In one embodiment, the first signaling is DCI with UL grant.

In one embodiment, the first signaling is a UE-specific physical layer signaling.

In one embodiment, the first signaling is a UE-specific higher layer signaling.

In one embodiment, the first signaling is a UE-specific Radio Resource Control (RRC) signaling.

In one embodiment, the subcarrier spacing corresponding to the first radio signal is one of 3.75 kHz, 15 kHz, 17.07 kHz, 17.5 kHz, 30 kHz, 60 kHz, 75 kHz, 120 kHz, 240 kHz or 480 kHz.

In one embodiment, a time domain resource occupied by the target time-frequency resource belongs to part of a Time Unit (TU). In one subembodiment, the TU lasts 1 ms. In one subembodiment, the TU lasts a fixed duration.

In one embodiment, the subcarrier spacing corresponding to the first radio signal is a positive integral multiple of 15 kHz.

In one embodiment, a frequency domain resource occupied by the first signaling belongs to the first frequency band.

In one embodiment, the first signaling is transmitted on a frequency domain resource other than the first frequency band.

In one embodiment, the first signaling occupies a part of the first frequency band in frequency domain.

In one embodiment, the subcarrier spacing corresponding to the first signaling is fixed.

In one embodiment, the subcarrier spacing corresponding to the first signaling is pre-defined.

In one embodiment, a modulation symbol in the first radio signal is mapped via a first feature sequence to K Resource Units (RUs) of the target time-frequency resource, each of the RUs occupies a subcarrier in frequency domain, and a multicarrier symbol as time duration in time domain.

In one subembodiment of the above embodiment, the multicarrier symbol is an Orthogonal Frequency Division Multiplexing (OFDM) symbol.

In one subembodiment of the above embodiment, the multicarrier symbol is a Single-Carrier Frequency Division Multiple Access (SC-FDMA) symbol.

In one subembodiment of the above embodiment, the multicarrier symbol is a Filter Bank Multi Carrier (FBMC) symbol.

In one subembodiment of the above embodiment, the multicarrier symbol is a Cyclic Prefix (CP)-included OFDM symbol.

In one subembodiment of the above embodiment, the multicarrier symbol is a CP-included Discrete Fourier Transform Spreading Orthogonal Frequency Division Multiplexing (DFT-s-OFDM) symbol.

In one embodiment, the first signaling is a physical layer signaling, the first signaling also comprises scheduling information of the first radio signal, the scheduling information includes at least one of a Modulation and Coding Status (MCS), an NDI, a Redundancy Version (RV), or a Hybrid Automatic Repeat reQuest (HARD) process number.

In one embodiment, the UE receives the first radio signal on the target time-frequency resource in the Step B, the first signaling is a physical layer signaling used for downlink grant, the first radio signal comprises downlink data and a downlink demodulation reference signal, the downlink demodulation reference signal is used for determining parameters of a radio channel which the downlink data goes through.

In one subembodiment of the above embodiment, a transmission channel for the downlink data is a Downlink Shared Channel (DL-SCH).

In one embodiment, the UE transmits the first radio signal on the target time-frequency resource in the Step B, the first signaling is a physical layer signaling used for UL grant, the first radio signal comprises uplink data and an uplink demodulation reference signal, the uplink demodulation reference signal is used for determining parameters of a radio channel which the uplink data goes through.

In one subembodiment, a transmission channel for the uplink data is an Uplink Shared Channel (UL-SCH).

In one embodiment, the first frequency band corresponds to a carrier of next generation wireless communication.

In one embodiment, the first frequency band occupies consecutive 100 MHz.

In one embodiment, the first frequency band occupies consecutive 20 MHz.

In one embodiment, the first signaling is used for determining a subcarrier spacing corresponding to the first radio signal and the target time-frequency resource.

In one embodiment, the first signaling is used for determining at least the former of a subcarrier spacing corresponding to the first radio signal or the target time-frequency resource, the first radio signal employs a Contention Based (CB) transmission method.

In one embodiment, the terminal group comprises a positive integer number of terminal(s), the UE is one of the terminal(s).

Specifically, according to one aspect of the present disclosure, the above method is characterized in that when the UE receiving a first signaling, the method in the UE also comprising:

receiving a second signaling, the second signaling being used for determining a first frequency band.

Herein, the second signaling is a broadcast signaling.

In one embodiment, a base station for a serving cell of the UE may occupy more than one carrier resource, and the more than one carrier resource may comprise only a part of carriers that support NR-based transmission.

In one embodiment, the second signaling is an information bit in a Master Information Block (MIB).

In one embodiment, the second signaling is Information Elements of a System Information Block (SIB).

Specifically, according to one aspect of the present disclosure, the above method is characterized in that when the UE receiving a first signaling, the method in the UE also comprising:

receiving a third signaling, the third signaling being used for determining a first time-frequency resource pool.

Herein, the first time-frequency resource pool belongs to the first frequency band in frequency domain. The UE assumes that radio signals in the first time-frequency resource pool correspond to a unified subcarrier spacing.

In the above method, the first time-frequency resource pool in the first frequency band employs a unified subcarrier spacing. In one embodiment, part of time-frequency resources in the first time-frequency resource pool are reserved for a synchronizing signal or broadcast information. The above embodiment prevents the UE from determining a subcarrier spacing employed by the synchronizing signal or broadcast information through blind detection, thus reducing the complexity of the UE.

In one embodiment, the unified subcarrier spacing is configurable.

In one embodiment, the unified subcarrier spacing is pre-defined (i.e., there is no need for explicit signaling configuration).

In one embodiment, the third signaling is used for determining the unified subcarrier spacing.

In one embodiment, a resource occupied by the first time-frequency resource pool in frequency domain is the first frequency band, the third signaling indicates a resource occupied by the first time-frequency resource pool in time domain.

In one embodiment, the first signaling is transmitted in the first time-frequency resource pool.

In one embodiment, the second signaling is transmitted in the first time-frequency resource pool.

In one embodiment, the third signaling is transmitted in the first time-frequency resource pool.

In one embodiment, the third signaling is a broadcast signaling.

In one embodiment, the third signaling is an information bit in a MIB.

In one embodiment, the third signaling is IEs in a SIB.

In one embodiment, the third signaling is a synchronizing signal.

In one embodiment, the third signaling comprises at least one of a Zadoff-Chu sequence or a pseudo random sequence.

In one embodiment, the first time-frequency resource pool is discrete in time domain.

In one embodiment, the first time-frequency resource pool also comprises at least one of a synchronizing sequence, or broadcast information, and at least one of the synchronizing sequence or the broadcast information is for the first frequency band.

Specifically, according to one aspect of the present disclosure, the above method is characterized in that the first signaling indicates the target time-frequency resource out of a second time-frequency resource pool. The first time-frequency resource pool and the second time-frequency resource pool are orthogonal in time domain, or the first time-frequency resource pool and the second time-frequency resource pool are orthogonal in frequency domain.

The above method helps reduce the overhead of the first signaling.

In one embodiment, the first time-frequency resource pool and the second time-frequency resource pool are orthogonal in time domain, a frequency domain resource occupied by the first time-frequency resource pool is the first frequency band, and a frequency domain resource occupied by the second time-frequency resource pool is the first frequency band.

In one embodiment, the first time-frequency resource pool and the second time-frequency resource pool are orthogonal in time domain, a time domain resource that can be used for transmitting data plane on the first frequency band is composed of a time domain resource occupied by the first time-frequency resource pool and a time domain resource occupied by the second time-frequency resource pool.

In one embodiment, the first time-frequency resource pool and the second time-frequency resource pool are orthogonal in frequency domain.

In one subembodiment of the above embodiment, a frequency domain resource occupied by the first time-frequency resource pool is the first frequency band, and a frequency domain resource occupied by the second time-frequency resource pool is a frequency domain resource other than the first frequency band.

The above subembodiment is characterized in that there are multiple NR carriers in a base station for a serving cell of the UE, and the first signaling can perform cross-carrier operations.

In one subembodiment of the above embodiment, a frequency domain resource occupied by the first time-frequency resource pool and a frequency domain resource occupied by the second time-frequency resource pool both belong to the first frequency band.

In one embodiment, when the UE receives a first signaling, the method in the UE also comprising:

receiving a fourth signaling, the fourth signaling being used for determining the second time-frequency resource pool.

An advantage of the above embodiment is that a frequency domain resource occupied by the second time-frequency resource pool is a sub-band in the first frequency band, and is indicated by a higher layer signaling, so as to reduce information bits in the first signaling used for dynamically indicating the target time-frequency resource.

In one subembodiment of the above embodiment, the fourth signaling is transmitted in the first time-frequency resource pool.

In one subembodiment of the above embodiment, the fourth signaling is a broadcast signaling.

In one subembodiment of the above embodiment, the fourth signaling is an information bit in a MIB.

In one subembodiment of the above embodiment, the fourth signaling is IEs in a SIB.

In one subembodiment of the above embodiment, the third signaling comprises the fourth signaling.

Specifically, according to one aspect of the present disclosure, the above method is characterized in that the phrase that "the UE assumes that radio signals in the first time-frequency resource pool correspond to a unified subcarrier spacing" refers to: the UE receives a second radio signal in the first time-frequency resource pool and the second radio signal corresponds to a same subcarrier spacing, or the UE transmits a third radio signal in the first time-frequency resource and the third radio signal corresponds to a same subcarrier spacing. The second radio signal comprises at least one of a first reference signal (RS), a synchronizing signal, MIB, SIB, or a downlink physical layer signaling. The third radio signal comprises at least one of a second RS or a random access channel. The first RS occurs in all first frequency domain units within the first frequency band in frequency domain, each of the first frequency domain units comprises a positive integer number of subcarrier(s). The second RS occurs in all second frequency domain units within the first frequency band in frequency domain, each of the second frequency domain units comprises a positive integer number of subcarrier(s).

The above method streamlines configuration information needed by the second radio signal or the third radio signal, namely, the configuration information will not vary according to subcarrier spacings configured by the first signaling.

In one embodiment, the third radio signal also comprises an uplink physical layer control channel.

In one embodiment, a bandwidth of the first frequency domain unit is less than or equal to ½ of a bandwidth of the first frequency band.

In one embodiment, a bandwidth of the second frequency domain unit is less than or equal to ½ of a bandwidth of the first frequency band.

In one embodiment, the first RS is used by the UE for generating Channel State Information (CSI).

In one embodiment, the second RS is used by a serving cell of the UE for generating CSI.

In one embodiment, the first signaling is one type of the downlink physical layer signaling.

In one embodiment, the first RS is a wideband RS.

In one embodiment, the second RS is a wideband RS.

In one embodiment, a number of subcarriers occupied by a given frequency domain unit is fixed. The given frequency domain unit is one of the first frequency domain unit and the second frequency domain unit.

In one embodiment, a frequency domain width occupied by a given frequency domain unit is fixed. The given frequency domain unit is one of the first frequency domain unit and the second frequency domain unit.

The present disclosure provides a method in a base station that supports configurable subcarrier spacings, comprising:

transmitting a first signaling; and transmitting a first radio signal on a target time-frequency resource, or receiving the first radio signal on the target time-frequency resource.

Herein, the first signaling is used for determining at least the former of a subcarrier spacing corresponding to the first radio signal or the target time-frequency resource. The target time-frequency resource belongs to the first frequency band in frequency domain. The first signaling is a physical layer signaling, or the first signaling is specific to a receiver of the first signaling, or the first signaling is specific to a terminal group and the receiver of the first signaling belongs to the terminal group.

Specifically, according to one aspect of the present disclosure, the above method in the base station comprising:

transmitting a second signaling, the second signaling being used for determining a first frequency band.

Herein, the second signaling is a broadcast signaling.

Specifically, according to one aspect of the present disclosure, the above method in the base station comprising:

transmitting a third signaling, the third signaling being used for determining a first time-frequency resource pool.

Herein, the first time-frequency resource pool belongs to the first frequency band in frequency domain. Radio signals in the first time-frequency resource pool employ a unified subcarrier spacing.

Specifically, according to one aspect of the present disclosure, the above method is characterized in that the first signaling indicates the target time-frequency resource out of a second time-frequency resource pool. The first time-frequency resource pool and the second time-frequency resource pool are orthogonal in time domain, or the first time-frequency resource pool and the second time-frequency resource pool are orthogonal in frequency domain.

In one embodiment, the method in the base station comprising:

transmitting a fourth signaling, the fourth signaling being used for determining the second time-frequency resource pool.

In one subembodiment of the above embodiment, the fourth signaling is transmitted in the first time-frequency resource pool.

In one subembodiment of the above embodiment, the fourth signaling is a broadcast signaling.

In one subembodiment of the above embodiment, the fourth signaling is an information bit in a MIB.

In one subembodiment of the above embodiment, the fourth signaling is IEs in a SIB.

In one subembodiment of the above embodiment, the third signaling comprises the fourth signaling.

Specifically, according to one aspect of the present disclosure, the above method is characterized in that the phrase that "radio signals in the first time-frequency resource pool correspond to a unified subcarrier spacing" refers to: the first time-frequency resource pool is reserved for a second radio signal, or the first time-frequency resource pool is reserved for a third radio signal. The second radio signal comprises at least one of a first RS, a synchronizing signal, MIB, SIB, or a downlink physical layer signaling. The third radio signal comprises at least one of a second RS or a random access channel. The first RS occurs in all first frequency domain units within the first frequency band in frequency domain, each of the first frequency domain units comprises a positive integer number of subcarrier(s). The second RS occurs in all second frequency domain units within the first frequency band in frequency domain, each of the second frequency domain units comprises a positive integer number of subcarrier(s).

The present disclosure provides a UE that supports configurable subcarrier spacings, comprising:

a first receiver: used for receiving a first signaling. And a first processer: used for receiving a first radio signal on a target time-frequency resource, or used for transmitting the first radio signal on the target time-frequency resource.

Herein, the first signaling is used for determining at least the former of a subcarrier spacing corresponding to the first radio signal or the target time-frequency resource. The target time-frequency resource belongs to the first frequency band in frequency domain. The first signaling is a physical layer signaling, or the first signaling is specific to the UE, or the first signaling is specific to a terminal group and the UE belongs to the terminal group.

In one embodiment, the first receiver also is used for receiving a second signaling, the second signaling is used for determining the first frequency band. Herein, the second signaling is a broadcast signaling.

In one embodiment, the first receiver is also used for receiving a third signaling, the third signaling is used for determining a first time-frequency resource pool. Herein, the first time-frequency resource pool belongs to the first frequency band in frequency domain. The UE assumes that radio signals in the first time-frequency resource pool correspond to a unified subcarrier spacing.

In one embodiment, the first receiver is also used for receiving a fourth signaling, the fourth signaling is used for determining the second time-frequency resource pool.

The present disclosure provides a base station that supports configurable subcarrier spacings, comprising:

a first transmitter: used for transmitting a first signaling. And a second processor: used for transmitting a first radio signal on a target time-frequency resource, or receiving the first radio signal on the target time-frequency resource.

Herein, the first signaling is used for determining at least the former of a subcarrier spacing corresponding to the first radio signal or the target time-frequency resource. The target time-frequency resource belongs to the first frequency band in frequency domain. The first signaling is a physical layer signaling, or the first signaling is specific to a receiver of the first signaling, or the first signaling is specific to a terminal group and the receiver of the first signaling belongs to the terminal group.

In one embodiment, the first transmitter is also used for transmitting a second signaling, the second signaling is used for determining the first frequency band. Herein, the second signaling is a broadcast signaling.

In one embodiment, the first transmitter is also used for transmitting a third signaling, the third signaling is used for determining a first time-frequency resource pool. Herein, the first time-frequency resource pool belongs to the first frequency band in frequency domain. Radio signals in the first time-frequency resource pool employ a unified subcarrier spacing.

In one embodiment, the first transmitter also is used for transmitting a fourth signaling, the fourth signaling is used for determining the second time-frequency resource pool.

Compared with the prior art, the present disclosure has the following technical advantages:

By designing the first signaling, a subcarrier spacing corresponding to the first radio signal is indicated dynamically or using a UE-specific method, so as to configure various subcarrier bandwidths flexibly in a system bandwidth, thus meeting requirements of a plurality of scenarios and applications.

Through the configuration of the first time-frequency resource pool, relevant channels not in need of dynamic adjustment to subcarrier spacings are then placed in the first time-frequency resource pool for transmission, so that the UE is able to acquire a subcarrier spacing without explicit indication and perform subsequent processing.

The first RS or the second RS is placed in the first time-frequency resource pool for transmission, thus enabling the UE and the base station to perform wideband channel measurement and estimation. And the wideband measurement will not suffer from any change in subcarrier spacing, thus providing steady outcomes of channel measurement for the system.

Configuration information required by the second radio signal and the third radio signal can be spared.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
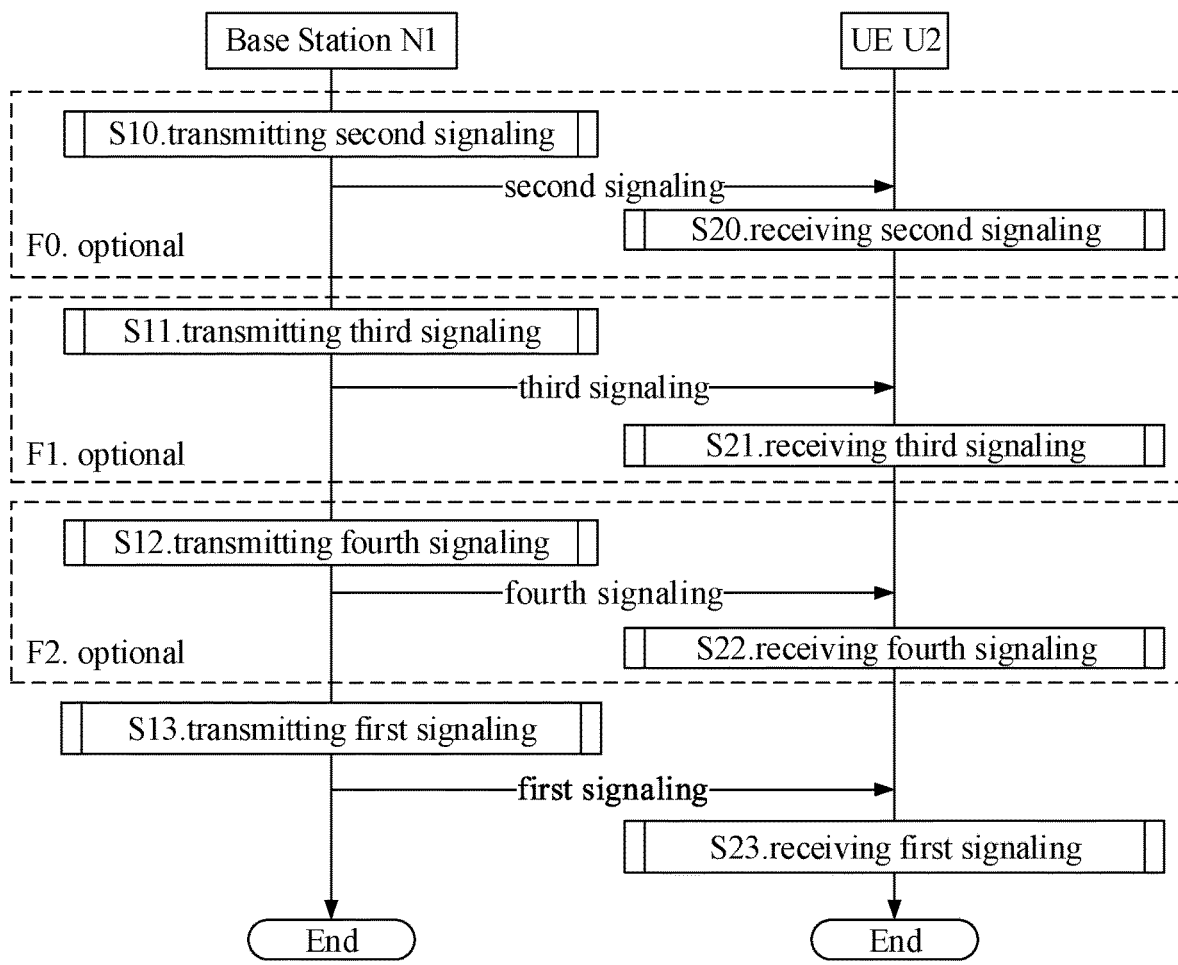
FIG. 1 illustrates a flowchart of transmission of a first signaling according to one embodiment of the present disclosure.

Embodiment 1 illustrates a flowchart of transmission of a first signaling, as shown in FIG. 1. In FIG. 1, a base station N1 is a maintenance base station for a serving cell of a UE U2. Steps marked in box F0, box F1 and box F2 are optional, respectively.

The base station N1 transmits a second signaling in Step S10, the second signaling being used for determining the first frequency band; transmits a third signaling in step S11, the third signaling being used for determining a first time-frequency resource pool; transmits a fourth signaling in step S12, the fourth signaling being used for determining the second time-frequency resource pool; and transmits a first signaling in step S13.

The UE U2 receives a second signaling in step S20, the second signaling being used for determining the first frequency band; receives a third signaling in step S21, the third signaling being used for determining a first time-frequency resource pool; receives a fourth signaling in step S22, the fourth signaling being used for determining the second time-frequency resource pool; and receives a first signaling in step S23.

In one embodiment, the first signaling is transmitted on a Physical Downlink Control Channel (PDCCH).

In one embodiment, the first signaling is transmitted on an Enhanced Physical Downlink Control Channel (EPDCCH).

In one embodiment, the first signaling is DCI used for downlink grant, or the first signaling is DCI used for uplink grant.

Embodiment 2

Figure 2:
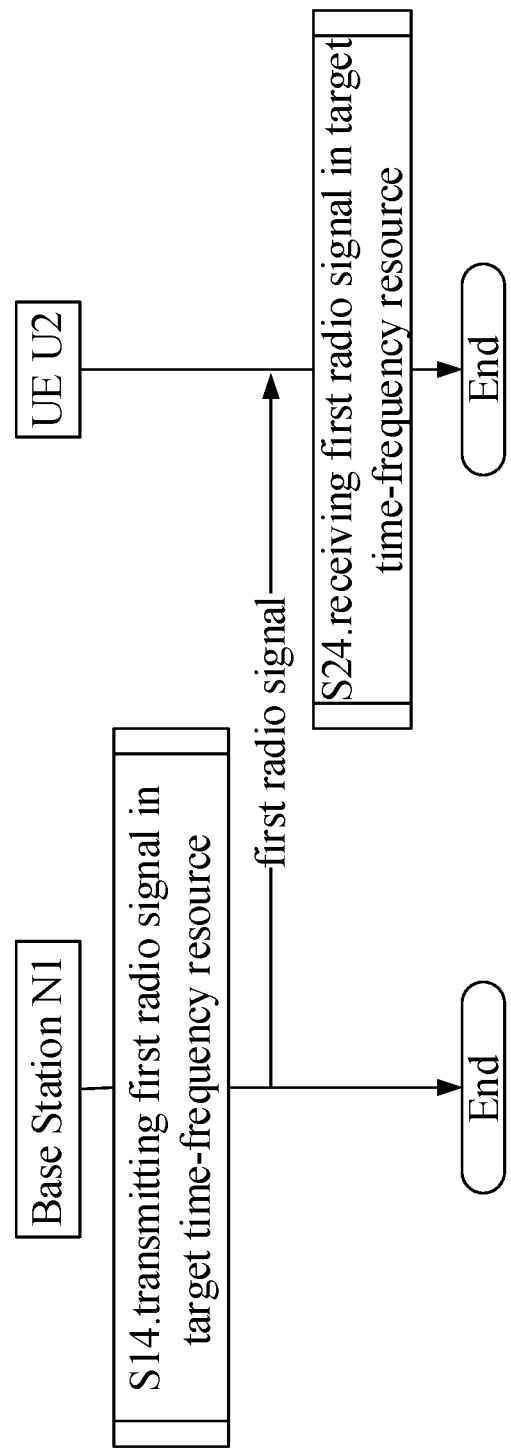
FIG. 2 illustrates a flowchart of transmission of a first radio signal according to one embodiment of the present disclosure.

Embodiment 2 illustrates a flowchart of transmission of a first radio signal, as shown in FIG. 2. In FIG. 2, a base station N1 is maintenance base station for a serving cell of a UE U2.

The base station N1 transmits a first radio signal on a target time-frequency resource in step S14.

The UE U2 receives a first radio signal on a target time-frequency resource in step S24.

In one embodiment, the target time-frequency resource occupies a positive integer number of RU(s). The RU(s) occupies(occupy) a subcarrier in frequency domain, and a multicarrier symbol as time duration in time domain.

In one embodiment, the multicarrier symbol is an OFDM symbol.

In one embodiment, the multicarrier symbol is an SC-FDMA symbol.

In one embodiment, the multicarrier symbol is an FBMC symbol.

In one embodiment, the multicarrier symbol is a CP-included OFDM symbol.

In one embodiment, the multicarrier symbol is a CP-included DFT-s-OFDM symbol.

In one embodiment, the first radio signal is transmitted on a Physical Downlink Shared Channel (PDSCH).

Embodiment 3

Figure 3:
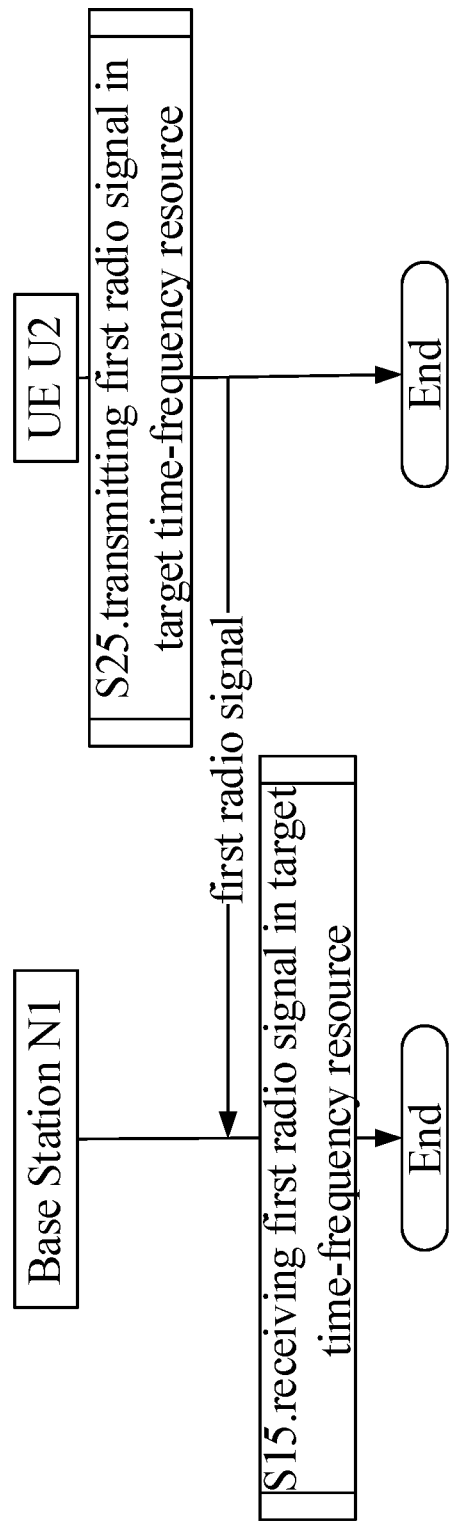
FIG. 3 illustrates a flowchart of transmission of a first radio signal according to another embodiment of the present disclosure.

Embodiment 3 illustrates another flowchart of transmission of a first radio signal, as shown in FIG. 3. In FIG. 3, a base station N1 is a maintenance base station for a serving cell of a UE U2.

The base station N1 receives a first radio signal on a target time-frequency resource in step S15.

The UE U2 transmits a first radio signal on a target time-frequency resource in step S25.

In one embodiment, the target time-frequency resource occupied a positive integer number of RU(s). the RU(s) occupies(occupy) a subcarrier in frequency domain, and a multicarrier symbol as time duration in time domain.

In one embodiment, the multicarrier symbol is an OFDM symbol.

In one embodiment, the multicarrier symbol is an SC-FDMA symbol.

In one embodiment, the multicarrier symbol is an FBMC symbol.

In one embodiment, the multicarrier symbol is a Filtered OFDM symbol.

In one embodiment, the multicarrier symbol is a CP-included OFDM symbol.

In one embodiment, the multicarrier symbol is a CP-included DFT-s-OFDM symbol.

In one embodiment, the first radio signal is transmitted on a Physical Uplink Shared Channel (PUSCH).

Embodiment 4

Figure 4:
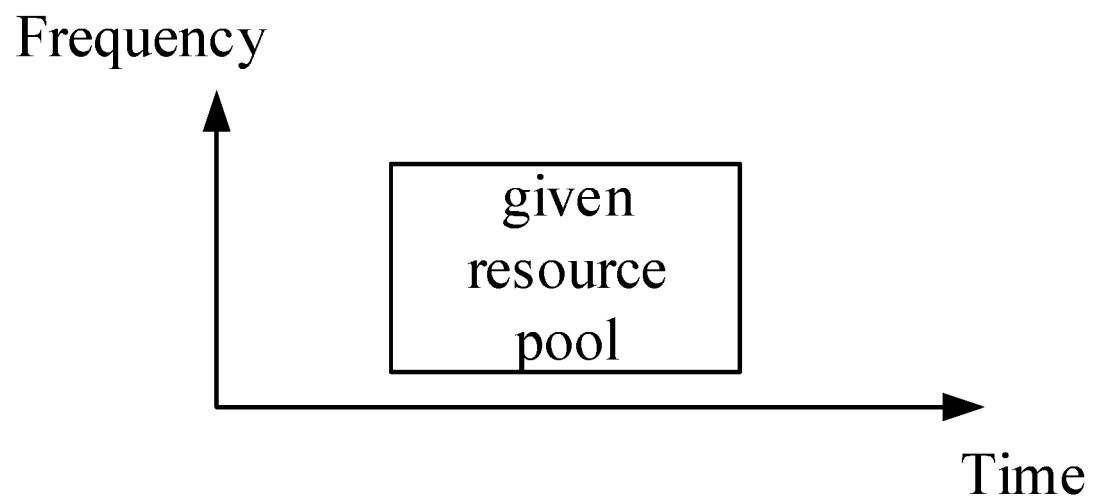
FIG. 4 illustrates a schematic diagram of a given time-frequency resource pool according to one embodiment of the present disclosure. The given time-frequency resource pool is one of a first time-frequency resource pool and a second time-frequency resource pool.

Embodiment 4 illustrates a schematic diagram of the given time-frequency resource pool according to the present disclosure. The given time-frequency resource pool is one of a first time-frequency resource pool and a second time-frequency resource pool. As shown in FIG. 4, the given time-frequency resource pool is consecutive in both frequency domain and time domain.

In one embodiment, the given time-frequency resource pool is the first time-frequency resource pool.

In one embodiment, the given time-frequency resource pool is the second time-frequency resource pool.

In one embodiment, the first time-frequency resource pool and the second time-frequency resource pool occupy a same frequency band resource in frequency domain.

In one embodiment, the given resource pool occupies a TU in time domain.

In one embodiment, the given resource pool occupies K TUs in time domain, wherein K is a positive integer greater than 1.

Embodiment 5

Figure 5:
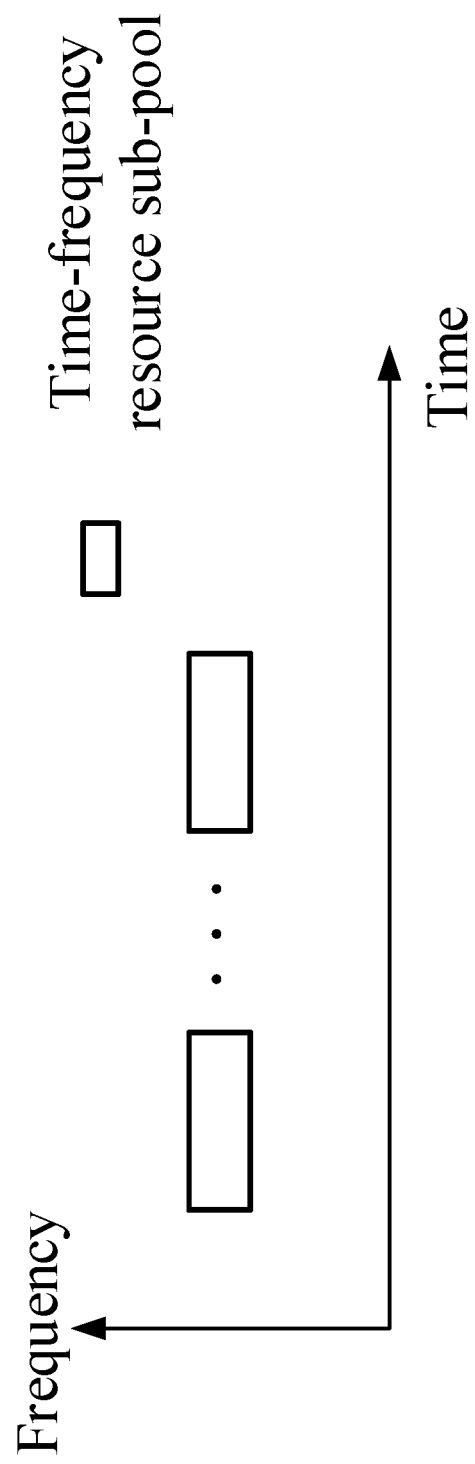
FIG. 5 illustrates a schematic diagram of time-frequency resource sub-pools according to one embodiment of the present disclosure. A plurality of the time-frequency resource sub-pools constitute a first time-frequency resource pool, or a plurality of the time-frequency resource sub-pools constitute a second time-frequency resource pool.

Embodiment 5 illustrates a schematic diagram of time-frequency resource sub-pools according to the present disclosure. A plurality of the time-frequency resource sub-pools constitute a first time-frequency resource pool, or a plurality of the time-frequency resource sub-pools constitute a second time-frequency resource pool. As shown in FIG. 5, the time-frequency resource sub-pools are discrete in time domain and are consecutive in frequency domain.

In one embodiment, the first time-frequency resource pool comprises a positive integer number of the time-frequency resource sub-pools.

In one embodiment, the second time-frequency resource pool comprises a positive integer number of the time-frequency resource sub-pools.

In one embodiment, the first time-frequency resource pool and the second time-frequency resource pool occupy a same frequency band resource in frequency domain, and are orthogonal in time domain.

In one embodiment, time-frequency resource sub-pools occupy a TU in time domain.

In one embodiment, a plurality of the time-frequency resource sub-pools constitute a TU in time domain.

Embodiment 6

Figure 6:
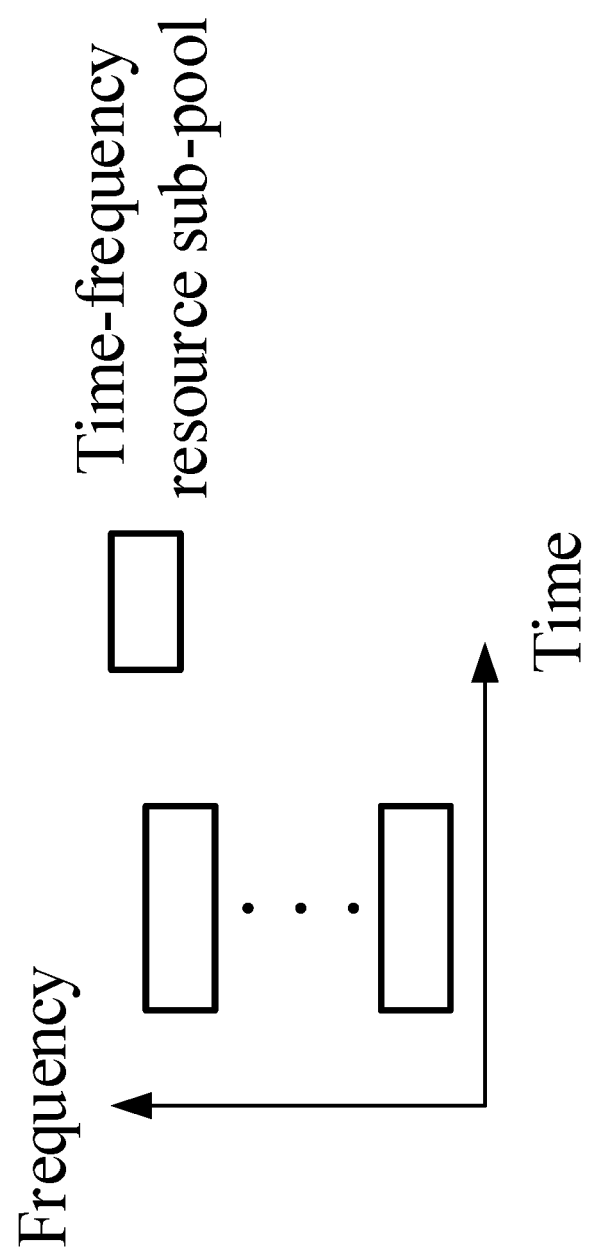
FIG. 6 illustrates a schematic diagram of time-frequency resource sub-pools according to another embodiment of the present disclosure. A plurality of the time-frequency resource sub-pools constitute a first time-frequency resource pool, or a plurality of the time-frequency resource sub-pools constitute a second time-frequency resource pool.

Embodiment 6 illustrates another schematic diagram of time-frequency resource sub-pools according to the present disclosure, a plurality of the time-frequency resource sub-pools constitute a first time-frequency resource pool, or a plurality of the time-frequency resource sub-pools constitute a second time-frequency resource pool. As shown in FIG. 6, the time-frequency resource sub-pools are discrete in frequency domain and are consecutive in time domain.

In one embodiment, the first time-frequency resource pool comprises a positive integer number of the time-frequency resource sub-pools.

In one embodiment, the second time-frequency resource pool comprises a positive integer number of the time-frequency resource sub-pools.

In one embodiment, the first time-frequency resource pool and the second time-frequency resource pool occupy a same frequency band resource in frequency domain, and are orthogonal in time domain.

In one embodiment, the time-frequency resource sub-pools occupy a TU in time domain.

In one embodiment, a plurality of the time-frequency resource sub-pools constitute K TUs, wherein K is a positive integer greater than 1.

Embodiment 7

Figure 7:
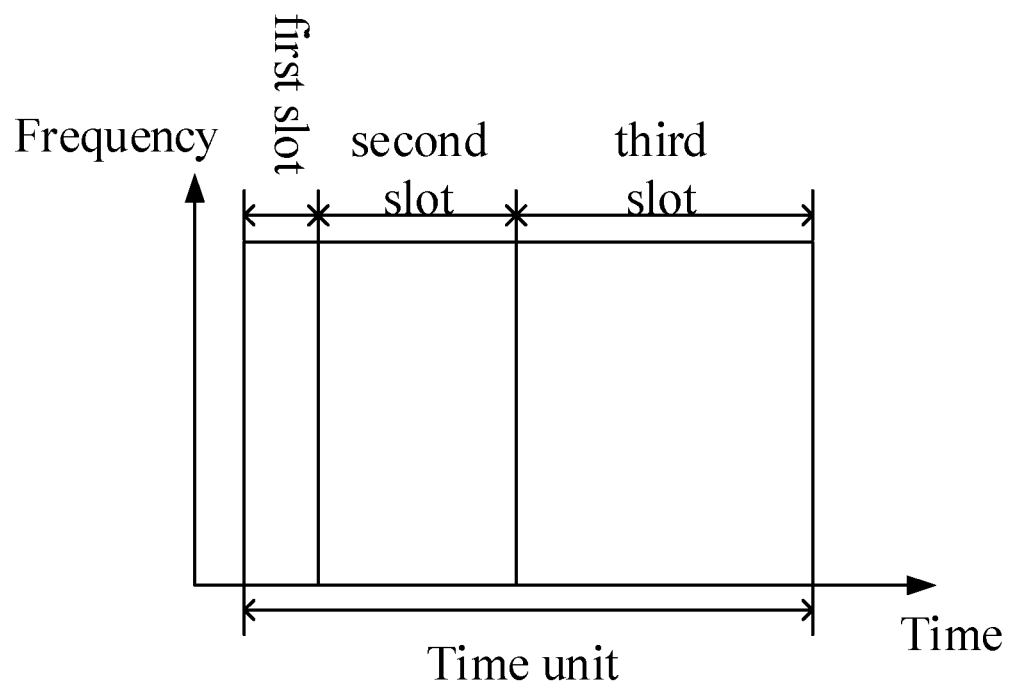
FIG. 7 illustrates a schematic diagram showing the first time-frequency resource pool and the second time-frequency resource pool in a TU according to one embodiment of the present disclosure.

Embodiment 7 illustrates a schematic diagram showing the first time-frequency resource pool and the second time-frequency resource pool in a TU according to the present disclosure, as shown in FIG. 7. In FIG. 7, the TU comprises a first slot, a second slot and a third slot. And the first slot, the second slot and the third slot respectively occupy a positive integer number of multicarrier symbols of duration in time domain.

In one embodiment, the positive integer number of subcarrier symbols may correspond to different subcarrier spacings.

In one embodiment, the TU is a time window occupied by a minimum scheduling of the system in time domain.

In one embodiment, duration time of the TU is a constant.

In one embodiment, the TU is equal to 1 ms.

In one embodiment, the TU is a positive integral multiple of 1 ms.

In one embodiment, the TU is less than 1 ms. In an affiliated embodiment of the above embodiment, the TU is equal to one of 0.125 ms, 0.25 ms, and 0.5 ms.

In one embodiment, the multicarrier symbol is one of an OFDM symbol, an SC-FDMA symbol, an FBMC symbol, a CP-included OFDM symbol, and a CP-included DFT-s-OFDM symbol.

In one embodiment, a time domain resource occupied by the first time-frequency resource pool in the TU comprises the second slot.

In one embodiment, a time domain resource occupied by the second time-frequency resource pool in the TU comprises at least one of the first slot or the third slot.

In one subembodiment, the first signaling of the present disclosure indicates a resource occupied by the target time-frequency resource of the present disclosure in time domain out of the third slot.

In one subembodiment, the first signaling of the present disclosure indicates a resource occupied by the target time-frequency resource in frequency domain out of the first frequency band of the present disclosure.

In one embodiment, a time domain resource occupied by the first RS belongs to the second slot.

Embodiment 8

Figure 8:
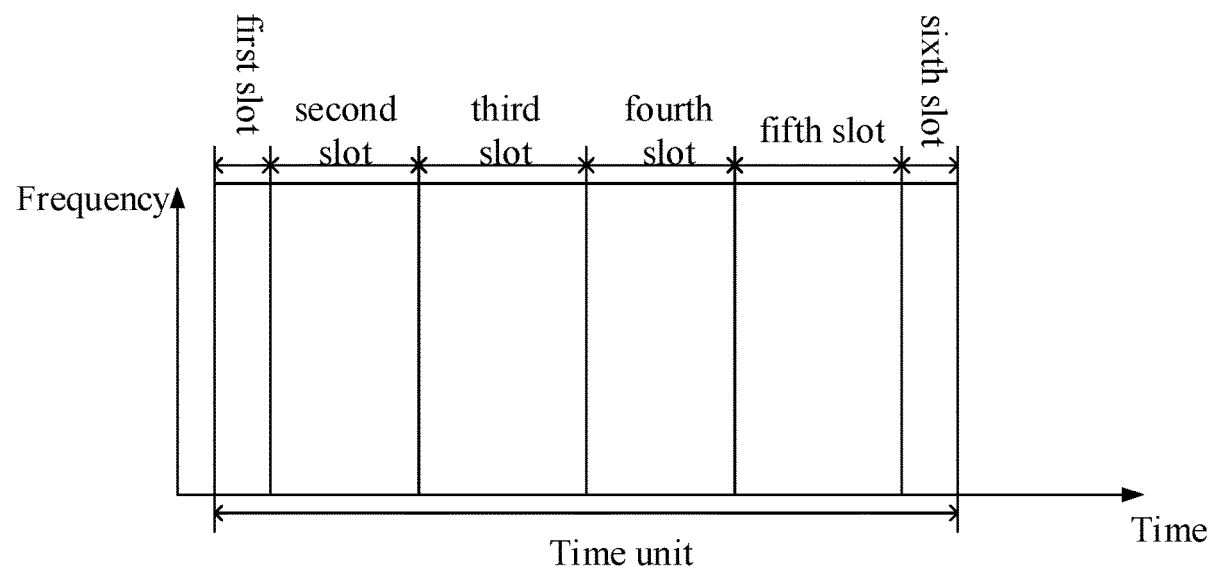
FIG. 8 illustrates a schematic diagram showing the first time-frequency resource pool and the second time-frequency resource pool in a TU according to another embodiment of the present disclosure.

Embodiment 8 illustrates another schematic diagram showing the first time-frequency resource pool and the second time-frequency resource pool in a TU according to the present disclosure, as shown in FIG. 8. In FIG. 8, the TU comprises slots ranging from a first slot to a sixth slot. Each slot respectively occupies a positive integer number of multicarrier symbols of duration in time domain.

In one embodiment, the positive integer number of multicarrier symbols may correspond to different subcarrier spacings.

In one embodiment, the TU is a time window occupied by a minimum scheduling of the system in time domain.

In one embodiment, the TU is equal to 1 ms.

In one embodiment, the TU is less than 1 ms.

In one embodiment, the TU is one of 0.125 ms, 0.25 ms, and 0.5 ms.

In one embodiment, the multicarrier symbol is one of an OFDM symbol, an SC-FDMA symbol, an FBMC symbol, a CP-included OFDM symbol, and a CP-included DFT-s-OFDM symbol.

In one embodiment, a time domain resource occupied by the first time-frequency resource pool in a TU belongs to at least one of the second slot or the sixth slot.

In one embodiment, a time domain resource occupied by the second time-frequency resource pool in a TU belongs to at least one of the first slot, the third slot or the fifth slot.

In one embodiment, the fourth slot is a Guard Period (GP).

In one embodiment, the base station does not transmit any signal in the fourth slot.

In one embodiment, a time domain resource occupied by the first RS belongs to the second slot.

In one embodiment, a time domain resource occupied by the second RS belongs to the sixth slot.

Embodiment 9

Figure 9:
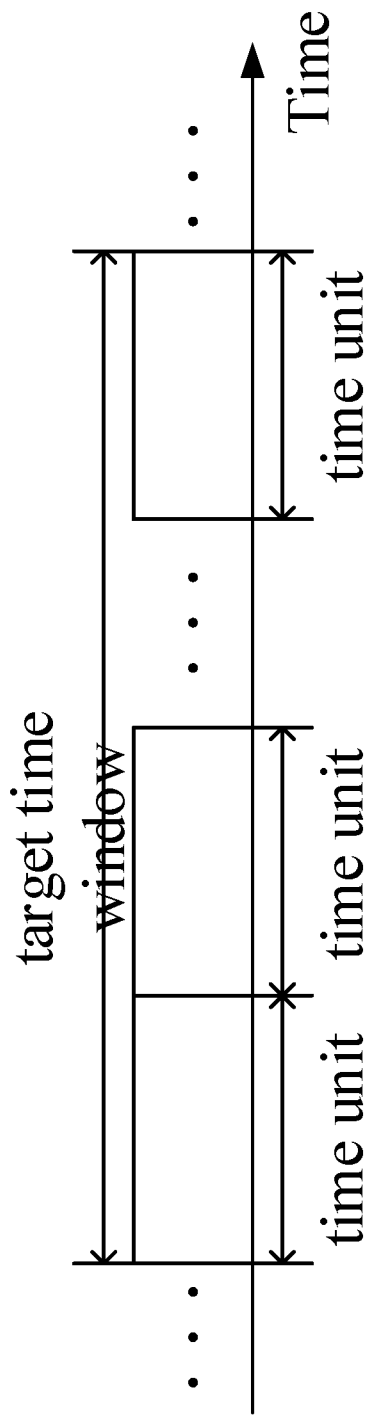
FIG. 9 illustrates a schematic diagram of a target time window according to one embodiment of the present disclosure.

Embodiment 9 illustrates a schematic diagram of a target time window, as shown in FIG. 9. In FIG. 9, a target time window comprises several consecutive TUs, each of the TUs occupies a positive integer number of subcarrier symbol(s) of duration in time domain.

In one embodiment, the TU lasts 1 ms, and time occupied by the target time window is Nms, wherein N is a positive integer.

In one embodiment, within the target time window, for any two TUs occupied by a first time-frequency resource pool, namely, TU #1 and TU #2, a subcarrier spacing corresponding to a time-frequency resource located in the TU #1 out of the first time-frequency resource pool is a first subcarrier spacing, and a subcarrier spacing corresponding to a time-frequency resource located in the TU #2 out of the first time-frequency resource pool is the first subcarrier spacing.

In one embodiment, for any two TUs occupied by a second time-frequency resource pool, namely, TU #1 and TU #2, a subcarrier spacing corresponding to a time-frequency resource located in the TU #1 out of the second time-frequency resource pool is a third subcarrier spacing, and a subcarrier spacing corresponding to a time-frequency resource located in the TU #2 out of the second time-frequency resource pool is a fourth subcarrier spacing. The third subcarrier spacing and the fourth subcarrier spacing are separately configured.

In one embodiment, there are at least a first TU and a second TU in the target time window, a time-frequency resource occupied by a first time-frequency resource pool in the first TU is different from that occupied by the first time-frequency resource pool in the second TU.

Embodiment 10

Figure 10:
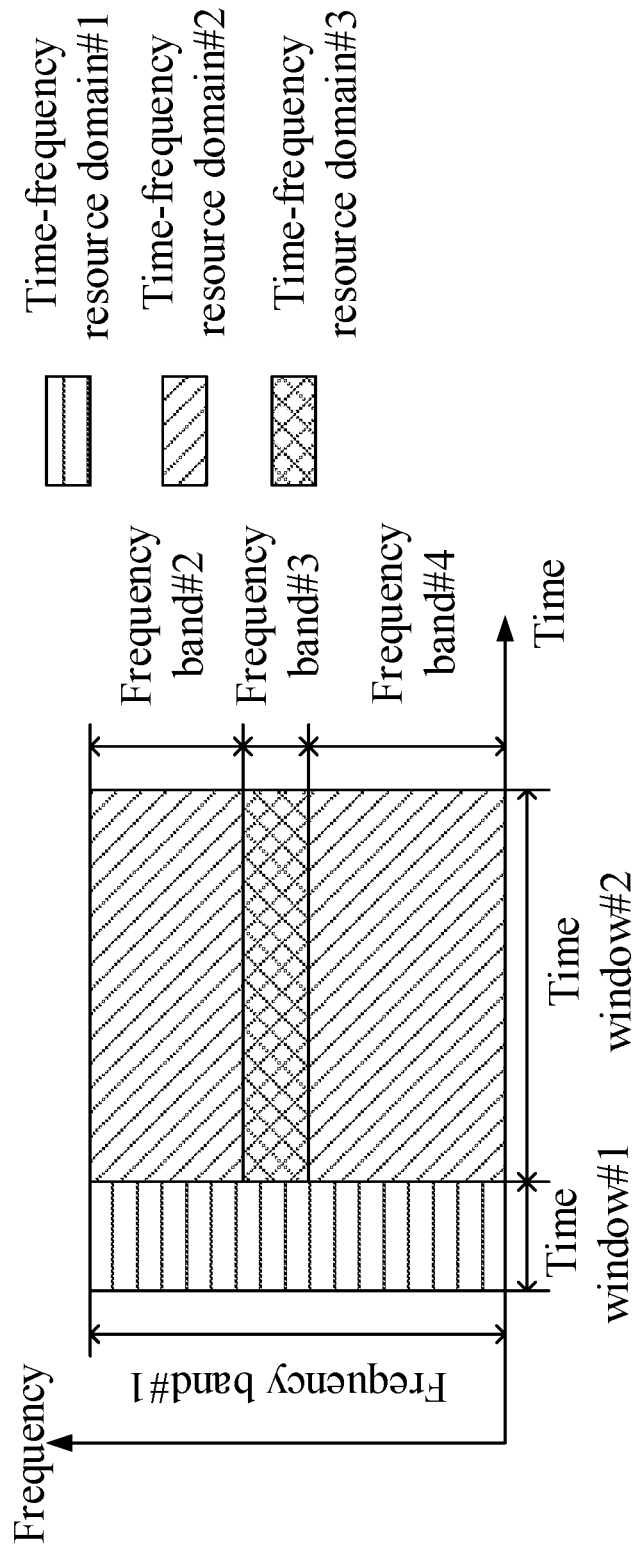
FIG. 10 illustrates a schematic diagram of time-frequency resource allocation according to one embodiment of the present disclosure.

Embodiment 10 illustrates a schematic diagram of time-frequency resource allocation, as shown in FIG. 10. In FIG. 10, frequency band #1 belongs to the first frequency band and consists of frequency band #2, frequency band #3 and frequency band #4. Time-frequency resource domain #1 belongs to the first time-frequency resource pool, and time-frequency resource domain #2 belongs to the second time-frequency resource pool. Time window #1 and time window #2 belong to a same TU. The time window #1 and the time window #2 respectively comprise a positive integer number of multicarrier symbol(s) in time domain.

In one embodiment, the time-frequency resource domain #2 employs different subcarrier spacings on the frequency band #2 and the frequency band #4 respectively, and the frequency band #3 is a Guard Band (GB).

In one embodiment, the time-frequency resource domain #2 employs different subcarrier spacings on the frequency band #2 and the frequency band #4 respectively, and a base station does not transmit any signal on the frequency band #3.

In one embodiment, the time-frequency resource domain #2 employs a same subcarrier spacing on the frequency band #2 and the frequency band #4 respectively, and the time-frequency resource domain #3 belongs to the second time-frequency resource pool.

In one embodiment, the time-frequency resource domain #1 and the time-frequency resource domain #2 employ different subcarrier spacings.

In one embodiment, a subcarrier spacing employed by the time-frequency resource domain #1 is independent from a subcarrier spacing employed by the time-frequency resource domain #2.

In one embodiment, the frequency band #1 is a first frequency band.

In one embodiment, the time window #1 and the time window #2 constitute a TU.

Embodiment 11

Figure 11:
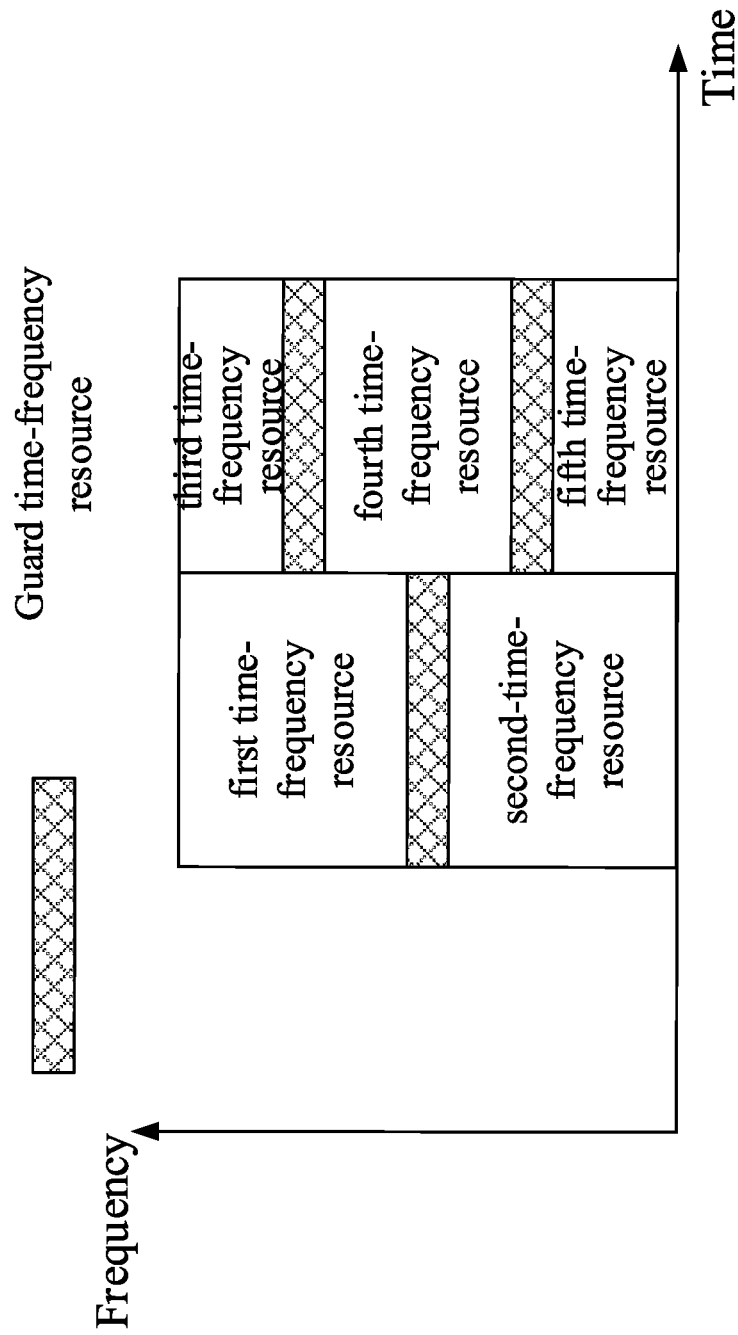
FIG. 11 illustrates a schematic diagram of time-frequency resource allocation according to another embodiment of the present disclosure.

Embodiment 11 illustrates another schematic diagram of time-frequency resource allocation, as shown in FIG. 11. In FIG. 11, a first time-frequency resource, a second time-frequency resource, a third time-frequency resource, a fourth time-frequency resource, a fifth time-frequency resource and a guard time-frequency resource all have the following characteristics:

belonging to a first frequency band in frequency domain;
belonging to a TU in time domain;
belonging to a second time-frequency resource pool.

In Embodiment 11, subcarrier spacings respectively employed by radio signals in a first time-frequency resource, a second time-frequency resource, a third time-frequency resource, a fourth time-frequency resource and a fifth time-frequency resource are separately configured.

In one embodiment, a base station avoids transmitting a radio signal in the guard time-frequency resource, and a UE avoids transmitting a radio signal in the guard time-frequency resource.

In one embodiment, the target time-frequency resource in the present disclosure is one of a first time-frequency resource, a second time-frequency resource, a third time-frequency resource, a fourth time-frequency resource and a fifth time-frequency resource.

Embodiment 12

Figure 12:
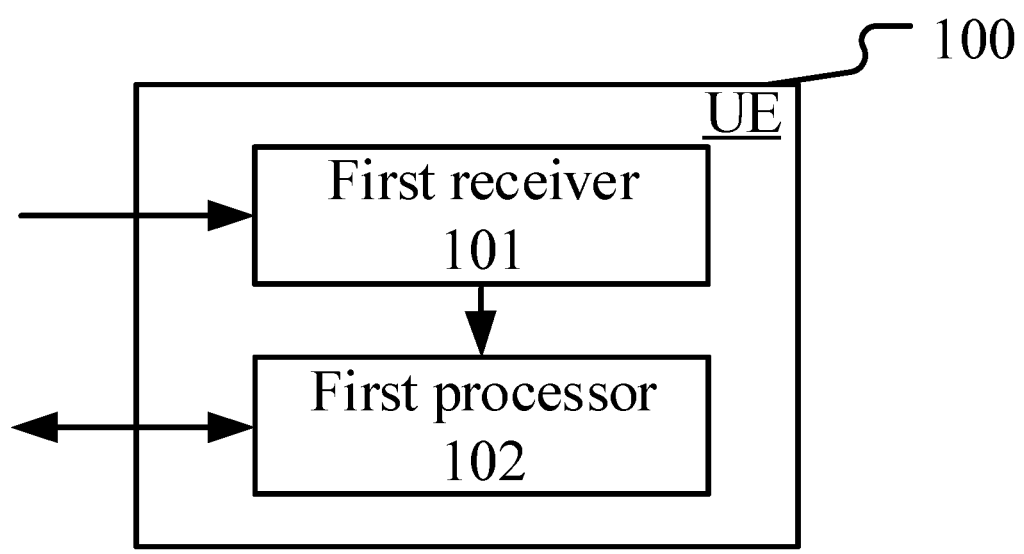
FIG. 12 illustrates a structure block diagram of a processing device in a UE according to one embodiment of the present disclosure.

Embodiment 12 illustrates a structure block diagram of a processing device in a UE, as shown in FIG. 12. In FIG. 12, a UE processing device 100 mainly consists of a first receiver 101 and a first processor 102.

The first receiver 101 is used for receiving a first signaling.

The first processor 102 is used for receiving a first radio signal on a target time-frequency resource, or is used for transmitting the first radio signal on the target time-frequency resource.

Herein, the first signaling is used for determining a subcarrier spacing corresponding to the first radio signal and the target time-frequency resource. The target time-frequency resource belongs to a first frequency band in frequency domain. The first signaling is a physical layer signaling, and the first signaling is UE-specific.

In one embodiment, the first receiver 101 is also used for receiving a second signaling, the second signaling is used for determining the first frequency band. Herein, the second signaling is a broadcast signaling.

In one embodiment, the first receiver 101 is also used for receiving a third signaling. The third signaling is used for determining a first time-frequency resource pool. Herein, the first time-frequency resource pool belongs to the first frequency band in frequency domain. The first time-frequency resource pool is reserved for a second radio signal, or the first time-frequency resource pool is reserved for a third radio signal. The second radio signal comprises at least one of a first RS, a synchronizing signal, MIB, SIB, or a downlink physical layer signaling. The third radio signal comprises at least one of a second RS, a random access channel or an uplink physical layer control channel. The first RS occurs in all first frequency domain units within the first frequency band in frequency domain, each of the first frequency domain units comprises a positive integer number of subcarrier(s). The second RS occurs in all second frequency domain units within the first frequency band in frequency domain, each of the second frequency domain units comprises a positive integer number of subcarrier(s). The uplink physical layer control channel can be used for transmitting at least one of Acknowledgement, CSI or SR.

In one embodiment, the first receiver also is used for receiving a fourth signaling, the fourth signaling is used for determining the second time-frequency resource pool.

Embodiment 13

Figure 13:
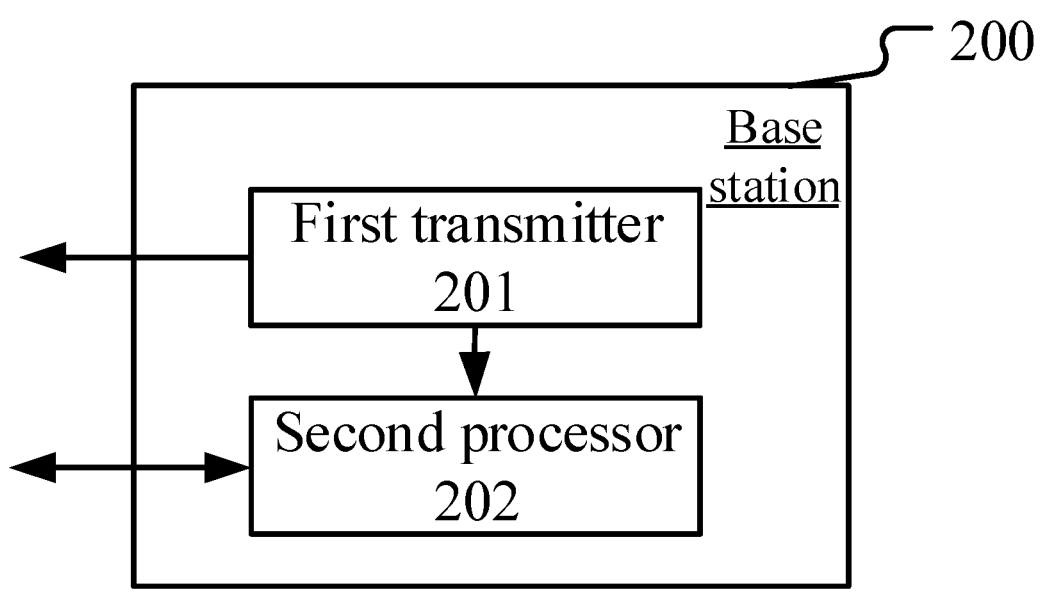
FIG. 13 illustrates a structure block diagram of a processing device in a base station according to one embodiment of the present disclosure.

Embodiment 13 illustrates a structure block diagram of a processing device in a base station, as shown in FIG. 13. In FIG. 13, a base station processing device 200 mainly consists a first transmitter 201 and a second processor 202.

The first transmitter 201 is used for transmitting a first signaling.

The second processor 202 is used for transmitting a first radio signal in a target time-frequency resource, or is used for receiving the first radio signal in the target time-frequency resource.

Herein, the first signaling is used for determining a subcarrier spacing corresponding to the first radio signal and the target time-frequency resource. The target time-frequency resource belongs to a first frequency band. The first signaling is a physical layer signaling.

In one embodiment, the first transmitter 201 is also used for transmitting a second signaling. The second signaling is used for determining the first frequency band. Herein, the second signaling is a broadcast signaling.

In one embodiment, the first transmitter 201 is also used for transmitting a third signaling, the third signaling is used for determining a first time-frequency resource pool. Herein, the first time-frequency resource pool belongs to the first frequency band in frequency domain. Radio signals in the first time-frequency resource pool employ a unified subcarrier spacing. The first time-frequency resource pool is reserved for a second radio signal, the second radio signal comprises at least one of a first RS, a synchronizing signal, MIB, SIB, or a downlink physical layer signaling. The first RS is wideband, and the first RS is a downlink RS.

In one embodiment, the first transmitter 201 also is used for transmitting a fourth signaling, the fourth signaling is used for determining the second time-frequency resource pool.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) that supports configurable subcarrier spacings, comprising:
   receiving a second signaling, the second signaling being used for determining a first frequency band;
   receiving a third signaling, the third signaling being used for determining a first time-frequency resource pool; receiving a first signaling; and receiving a first radio signal on a target time-frequency resource, or transmitting the first radio signal on the target time-frequency resource;
   wherein the first signaling is used for determining a subcarrier spacing corresponding to the first radio signal; the target time-frequency resource belongs to the first frequency band in frequency domain;
   the first signaling is a higher layer signaling specific to the UE; the second signaling is a broadcast signaling; the first time-frequency resource pool belongs to the first frequency band in frequency domain; the UE assumes that radio signals in the first time-frequency resource pool correspond to a unified subcarrier spacing; the third signaling is a broadcast signaling; the unified subcarrier spacing is configurable, the third signaling is used for determining the unified subcarrier spacing.

2. The method according to claim 1, wherein the first signaling indicates the target time-frequency resource out of a second time-frequency resource pool; the first time-frequency resource pool and the second time-frequency resource pool are orthogonal in time domain, or the first time-frequency resource pool and the second time-frequency resource pool are orthogonal in frequency domain.

3. The method according to claim 1, wherein the phrase that "the UE assumes that radio signals in the first time-frequency resource pool correspond to a unified subcarrier spacing" refers to: the UE receives a second radio signal in the first time-frequency resource pool and the second radio signal corresponds to a same subcarrier spacing, or the UE transmits a third radio signal in the first time-frequency resource pool and the third radio signal corresponds to a same subcarrier spacing; the second radio signal comprises at least one of a first reference signal (RS), a synchronizing signal, MIB, SIB, or a downlink physical layer signaling; the third radio signal comprises at least one of a second RS or a random access channel; the first RS occurs in all first frequency domain units within the first frequency band in frequency domain, each of the first frequency domain units comprises a positive integer number of subcarrier(s); the second RS occurs in all second frequency domain units within the first frequency band in frequency domain, each of the second frequency domain units comprises a positive integer number of subcarrier(s).

4. The method according to claim 1, wherein the first signaling is further used for determining the target time-frequency resource.

5. A method in a base station that supports configurable subcarrier spacings, comprising:
transmitting a second signaling, the second signaling being used for determining a first frequency band;
transmitting a third signaling, the third signaling being used for determining a first time-frequency resource pool;
transmitting a first signaling; and transmitting a first radio signal on a target time-frequency resource, or receiving the first radio signal on the target time-frequency resource;
wherein the first signaling is used for determining a subcarrier spacing corresponding to the first radio signal; the target time-frequency resource belongs to the first frequency band in frequency domain;
the first signaling is a higher layer signaling specific to a receiver of the first signaling; the second signaling is a broadcast signaling; the first time-frequency resource pool belongs to the first frequency band in frequency domain; the receiver of the first signaling assumes that radio signals in the first time-frequency resource pool employ a unified subcarrier spacing; the third signaling is a broadcast signaling; the unified subcarrier spacing is configurable, the third signaling is used for determining the unified subcarrier spacing.

6. The method according to claim 5, wherein the first signaling indicates the target time-frequency resource out of a second time-frequency resource pool; the first time-frequency resource pool and the second time-frequency resource pool are orthogonal in time domain, or the first time-frequency resource pool and the second time-frequency resource pool are orthogonal in frequency domain.

7. The method according to claim 5, wherein the phrase that "radio signals in the first time-frequency resource pool employ a unified subcarrier spacing" refers to: the first time-frequency resource pool is reserved for a second radio signal, or the first time-frequency resource pool is reserved for a third radio signal; the second radio signal comprises at least one of a first RS, a synchronizing signal, MIB, SIB, or a downlink physical layer signaling; the third radio signal comprises at least one of a second RS or a random access channel; the first RS occurs in all first frequency domain units within the first frequency band in frequency domain, each of the first frequency domain units comprises a positive integer number of subcarrier(s); the second RS occurs in all second frequency domain units within the first frequency band in frequency domain, each of the second frequency domain units comprises a positive integer number of subcarrier(s).

8. The method according to claim 5, wherein the first signaling is further used for determining the target time-frequency resource.

9. A UE that supports configurable subcarrier spacings, comprising: a first receiver: used for receiving a first signaling, a second signaling and a third signaling; the second signaling is used for determining a first frequency band; the third signaling is used for determining a first time-frequency resource pool; and a first processer: used for receiving a first radio signal on a target time-frequency resource, or used for transmitting the first radio signal on the target time-frequency resource;
wherein the first signaling is used for determining a subcarrier spacing corresponding to the first radio signal; the target time-frequency resource belongs to the first frequency band in frequency domain;
the first signaling is a higher layer signaling specific to the UE; the second signaling is a broadcast signaling; the first time-frequency resource pool belongs to the first frequency band in frequency domain; the UE assumes that radio signals in the first time-frequency resource pool correspond to a unified subcarrier spacing; the third signaling is a broadcast signaling; the unified subcarrier spacing is configurable, the third signaling is used for determining the unified subcarrier spacing.

10. The UE according to claim 9, wherein the first signaling indicates the target time-frequency resource out of a second time-frequency resource pool; the first time-frequency resource pool and the second time-frequency resource pool are orthogonal in time domain, or the first time-frequency resource pool and the second time-frequency resource pool are orthogonal in frequency domain.

11. The UE according to claim 10, wherein the first receiver is also used for receiving a fourth signaling, the fourth signaling is used for determining the second time-frequency resource pool.

12. The UE according to claim 9, wherein the first signaling is further used for determining the target time-frequency resource.

13. A base station that supports configurable subcarrier spacings, comprising:
a first transmitter: used for transmitting a first signaling, a second signaling and a third signaling; the second signaling is used for determining a first frequency band; the third signaling is used for determining a first time-frequency resource pool; and a second processer: used for transmitting a first radio signal on a target time-frequency resource, or receiving the first radio signal on the target time-frequency resource;
wherein the first signaling is used for determining a subcarrier spacing corresponding to the first radio signal; the target time-frequency resource belongs to the first frequency band in frequency domain;
the first signaling is a higher layer signaling specific to a receiver of the first signaling; the second signaling is a broadcast signaling; the first time-frequency resource pool belongs to the first frequency band in frequency domain; the receiver of the first signaling assumes that radio signals in the first time-frequency resource pool employ a unified subcarrier spacing; the third signaling is a broadcast signaling; the unified subcarrier spacing is configurable, the third signaling is used for determining the unified subcarrier spacing.

14. The base station according to claim 13, wherein the first signaling indicates the target time-frequency resource out of a second time-frequency resource pool; the first time-frequency resource pool and the second time-frequency resource pool are orthogonal in time domain, or the first time-frequency resource pool and the second time-frequency resource pool are orthogonal in frequency domain.

15. The base station according to claim 14, wherein the first transmitter is also used for transmitting a fourth signaling, the fourth signaling being used for determining the second time-frequency resource pool.

16. The base station according to claim 13, wherein the first signaling is further used for determining the target time-frequency resource.

* * * * *